United States Patent
Cui et al.

(10) Patent No.: US 12,401,870 B2
(45) Date of Patent: Aug. 26, 2025

(54) IMAGE ACQUISITION APPARATUS AND SELF-MOVING DEVICE

(71) Applicant: Willand (Beijing) Technology Co., LTD., Beijing (CN)

(72) Inventors: Junwei Cui, Beijing (CN); Xubin Zhen, Beijing (CN); Wanyang Qiao, Beijing (CN)

(73) Assignee: Willand (Beijing) Technology Co., LTD., Beijing (CN)

( * ) Notice: Subject to any disclaimer, the term of this patent is extended or adjusted under 35 U.S.C. 154(b) by 180 days.

(21) Appl. No.: 18/355,635

(22) Filed: Jul. 20, 2023

(65) Prior Publication Data
US 2024/0056659 A1 Feb. 15, 2024

(30) Foreign Application Priority Data
Aug. 11, 2022 (CN) .......................... 202222116678.9

(51) Int. Cl.
*H04N 23/51* (2023.01)
*G03B 11/04* (2021.01)
(Continued)

(52) U.S. Cl.
CPC .......... *H04N 23/51* (2023.01); *G03B 11/045* (2013.01); *G03B 17/02* (2013.01); *G03B 17/55* (2013.01);
(Continued)

(58) Field of Classification Search
CPC ........ H04N 23/50; H04N 23/51; H04N 23/52; H04N 23/54; H04N 23/57; G03B 11/04;
(Continued)

(56) References Cited

U.S. PATENT DOCUMENTS 4,414,576 A * 11/1983 Randmae ................ H04N 23/51
219/520
5,966,176 A * 10/1999 Chow .............. G08B 13/19632
348/373
(Continued)

FOREIGN PATENT DOCUMENTS

CN 202435490 U 9/2012
CN 206932299 U 1/2018
(Continued)

OTHER PUBLICATIONS

Office Action issued on Sep. 18, 2024, in corresponding Australian Application No. 2023208095, 7 pages.
(Continued)

*Primary Examiner* — Daniel M Pasiewicz
(74) *Attorney, Agent, or Firm* — Maier & Maier, PLLC (57) ABSTRACT

An image acquisition apparatus and a self-moving device. The image acquisition apparatus includes a base; an upper box body, the upper box body is detachably disposed on the base, a cavity is formed between the upper box body and the base, and a front end face of the upper box body is provided with a window; a camera assembly, the camera assembly is fixedly disposed on the base and is placed in the cavity, and the camera assembly and the window are correspondingly provided; a sunshading part, the sunshading part is disposed at a side of the upper box body away from the base, and the sunshading part is disposed spaced from the upper box body.

13 Claims, 6 Drawing Sheets

(51) Int. Cl.
*G03B 17/02* (2021.01)
*G03B 17/55* (2021.01)
*G03B 17/56* (2021.01)
*G03B 29/00* (2021.01)
*G03B 30/00* (2021.01)
*H04N 23/52* (2023.01)

(52) U.S. Cl.
CPC ........... *G03B 17/561* (2013.01); *G03B 29/00* (2013.01); *G03B 30/00* (2021.01); *H04N 23/52* (2023.01)

(58) Field of Classification Search
CPC ...... G03B 11/045; G03B 17/02; G03B 17/08; G03B 17/55; G03B 17/561; G03B 29/00; G03B 30/00
See application file for complete search history.

(56) References Cited

U.S. PATENT DOCUMENTS

| | | | | |
|---|---|---|---|---|
| 10,845,465 | B2* | 11/2020 | Krishnan | B60S 1/56 |
| 11,457,558 | B1* | 10/2022 | Phanco | G06T 7/10 |
| 2004/0076415 | A1* | 4/2004 | Da Silva | G03B 17/08 |
| | | | | 396/25 |
| 2015/0116590 | A1 | 4/2015 | Huang et al. | |
| 2015/0264228 | A1* | 9/2015 | Grotto | G08B 13/19619 |
| | | | | 348/373 |
| 2018/0125003 | A1* | 5/2018 | Wu | G06V 10/462 |
| 2019/0313001 | A1* | 10/2019 | Kawashima | G03B 17/55 |
| 2024/0081176 | A1* | 3/2024 | Cong | A01D 34/008 |

FOREIGN PATENT DOCUMENTS

| | | |
|---|---|---|
| CN | 108761969 A | 11/2018 |
| CN | 212727220 U | 3/2021 |
| CN | 216357961 U | 4/2022 |
| CN | 217406897 U | 9/2022 |
| CN | 218550474 U | 2/2023 |
| EP | 3355288 A1 | 8/2018 |
| EP | 4338566 A1 | 3/2024 |
| SE | 2150016 A1 | 7/2022 |
| WO | 2020155820 A1 | 6/2020 |

OTHER PUBLICATIONS

Extended Search Report issued on Jan. 22, 2024, in corresponding European Application No. 23186727.6, 8 pages.
Notification of Grant issued on Nov. 15, 2022, in corresponding Chinese Application No. 202222116678.9, 2 pages.
Office Action issued on Jun. 28, 2024, in corresponding European Application No. 23 186 727.6, 11 pages.

* cited by examiner

IMAGE ACQUISITION APPARATUS AND SELF-MOVING DEVICE

CROSS-REFERENCE TO RELATED APPLICATIONS

This application claims priority to Chinese Patent Application No. 202222116678.9, filed on Aug. 11, 2022, which is hereby incorporated by reference in its entirety.

TECHNICAL FIELD

The present application relates to the field of image acquisition technology and, in particular, to an image acquisition apparatus and a self-moving device.

BACKGROUND

When some large machines such as harvesters and mowers work outdoors, the situation of visual blind spots may occur, therefore an image acquisition apparatus needs to be installed to assist the machines to work. Because the image acquisition apparatus, when working, needs to perform data processing on the pictures acquired by the image acquisition apparatus itself, the data processing volume is large, the heat generation is serious. In addition, the image acquisition apparatus cannot avoid direct sunlight when working outdoors, which also causes temperature rise of the image acquisition apparatus and even device damage.

The problem of high temperature rise of the existing image acquisition apparatus cannot be solved by the structure of the image acquisition apparatus, which leads to reduced working efficiency of the image acquisition apparatus.

SUMMARY

In order to solve the aforesaid problem, the present application provides an image acquisition apparatus to solve the problem of high temperature rise of the image acquisition apparatus. According to the first aspect of the present application, it is provided an image acquisition apparatus including: a base; an upper box body, the upper box body is detachably disposed on the base, a cavity is formed between the upper box body and the base, and a front end face of the upper box body is provided with a window; a camera assembly, the camera assembly is fixedly disposed on the base and is placed in the cavity, and the camera assembly and the window are correspondingly provided; a sunshading part, the sunshading part is disposed at a side of the upper box body away from the base, and the sunshading part is disposed spaced from the upper box body.

Optionally, a surface of the sunshading part near the upper box body is provided with a plurality of bolts, and a surface of the upper box body near the sunshading part is provided with a plurality of bolt holes.

Optionally, a lower surface of the base is provided with a wiring hole for a wire harness to pass through, and a rubber plug is disposed between the wire harness and the wiring hole.

Optionally, an upper surface of the base is provided with a circle of closed groove, and an inner surface of the upper box body is vertically provided with a circle of closed first rib, and the first rib is embedded in the groove for interference fit. The first rib, the groove, the base, and the upper box body enclose to form a first cavity, and the camera assembly is placed in the first cavity.

Optionally, a waterproof ring is disposed in the groove, and an upper surface of the first rib is pressed against the waterproof ring.

Optionally, the upper box body further includes a transparent part, and the transparent part is embedded on the window.

Optionally, the camera assembly includes a control board, a camera bracket, and a camera; the control board is fixedly disposed on the base, the camera bracket is vertically disposed on the base, the camera bracket is disposed in front of the control board, the camera is fixedly disposed on the camera bracket, the camera and the window are correspondingly provided, and the control board is electrically connected to the camera and the wire harness, respectively.

Optionally, the sunshading part is convex, and the sunshading part is provided with a plurality of heat dissipation holes.

Optionally, the image acquisition apparatus further includes a decorative cover plate; the decorative cover plate is detachably disposed above the sunshading part.

Optionally, the image acquisition apparatus further includes a front cover; the front cover is provided with a through-hole; the front cover is disposed in front of the upper box body, the upper box body is detachably connected with the front cover, and the through-hole and the window are correspondingly provided.

Optionally, the image acquisition apparatus further includes a heat-conducting plate; the heat-conducting plate is disposed between the base and the control board.

Optionally, the image acquisition apparatus further includes a heat dissipation part; the heat dissipation part includes a plurality of second ribs, and the surface of the base away from the camera assembly is vertically disposed with the plurality of second ribs at predetermined intervals, and the plurality of second ribs are configured to increase the surface area of the base. According to the second aspect of the present application, it is provided a self-moving device including an image acquisition apparatus as described above.

For the image acquisition apparatus of the present application, the sunshading part is disposed at the side of the upper box body away from the base, and the sunshading part is disposed spaced from the upper box body, and the sunshading part is used to shade the sunlight to avoid the sunlight from directly irradiating the upper box body, thereby reducing light energy absorbed by the upper box body, and reducing temperature rise of the camera assembly inside the upper box body. On the other hand, the upper box body and the sunshading part are disposed spaced from each other, and an air flow layer is formed between the upper box body and the sunshading part. The air flow layer is blocked between the sunshading part and the upper box body, thereby preventing the transfer of heat from the sunshading part to the upper box body, and thus reducing temperature rise of the camera assembly inside the upper box body. Further, the air flowing inside the air flow layer takes away heat from the upper box body and the sunshading part, thereby reducing temperature rise of the camera assembly inside the upper box body. The image acquisition apparatus of the present application solves the problem of high temperature rise of the image acquisition apparatus and enhances the working efficiency of the image acquisition apparatus.

DETAILED DESCRIPTION OF EMBODIMENTS

In order to make the objectives, technical solutions and advantages of the present application clearer, the following will be described in further detail on embodiments of the present application in conjunction with the accompanying drawings.

In the description of the present application, it needs to be understood that the terms "center", "up", "down", "front", "back", "left", "right", "vertical", "horizontal", "top", "bottom", "inside", "outside", and the like indicate the orientation or positional relationship based on that shown in the accompanying drawings. This is intended only to facilitate and simplify the description of the present application, and is not intended to indicate or imply that the apparatus or component referred to must have a particular orientation, be constructed and operated in a particular orientation, and therefore is not to be construed as a limitation of the present application.

In the description of the present application, it should be illustrated that, unless otherwise expressly specified and limited, the terms "mount", "connection", and "connected" are to be understood in a broad sense, for example, the connection can be a fixed connection, a detachable connection, or an integrated connection; a mechanical connection or an electrical connection; a direct connection or an indirect connection through an intermediate medium; or an inner-connection within two components. To a person of ordinary skill in the art, the specific meaning of the above terms in the present application can be understood in specific cases.

Figure 1:
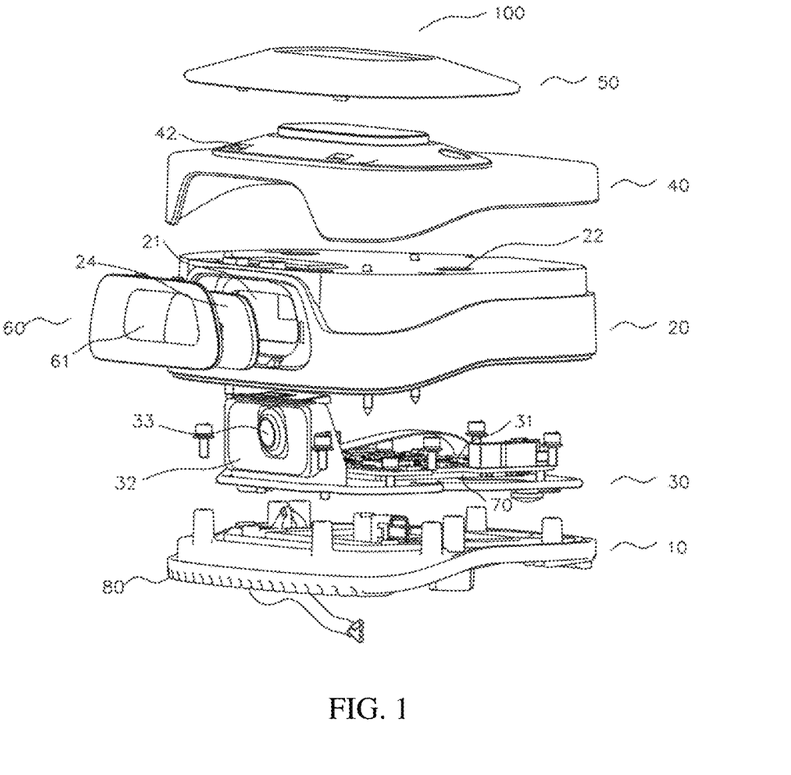
FIG. 1 is an overall exploded schematic diagram of an image acquisition apparatus provided in accordance with the present application.
Figure 2:
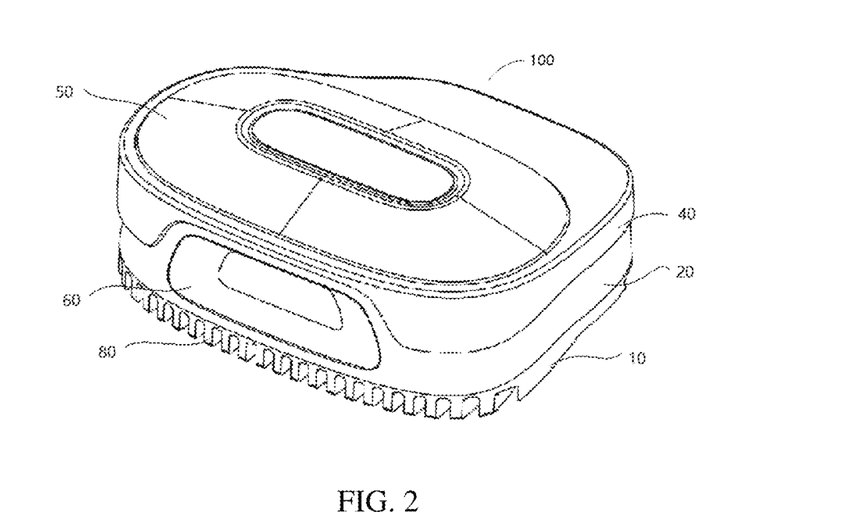
FIG. 2 is an overall structure schematic diagram of an image acquisition apparatus provided in accordance with the present application.

Referring to FIGS. 1 to 2, the present application provides an image acquisition apparatus 10 that can solves the problem of high temperature rise of the image acquisition apparatus 100 and enhance working efficiency of the image acquisition apparatus 100.

The image acquisition apparatus 100 provided in the present application includes a base 10, an upper box body 20, a camera assembly 30, and a sunshading part 40, the upper box body 20 is detachably disposed on the base 10, a cavity is formed between the upper box body 20 and the base 10, and a front end face of the upper box body 20 is provided with a window 21; the camera assembly 30 is fixedly disposed on the base 10 and is placed in the cavity, and the camera assembly 30 and the window 21 are correspondingly provided; the sunshading part 40 is disposed at a side of the upper box body 20 away from the base 10, and the sunshading part 40 is disposed spaced from the upper box body 20.

The base 10 and the upper box body 20 of the image acquisition apparatus 100 provided in the present application form the cavity for placing the camera assembly 30, and the base 10 is used to fix the camera assembly 30, and the sunshading part 40 is disposed at the side of the upper box body 20 away from the base, and the sunshading part 40 is disposed spaced from the upper box body 20. The sunshading part 40 is configured to shade the sunlight to avoid the sunlight from directly irradiating the upper box body 20, thereby reducing light energy absorbed by the upper box body 20, and thus reducing temperature rise of the camera assembly 30 inside the upper box body 20. On the other hand, the upper box body 20 is disposed spaced from the sunshading part 40, and an air flow layer is formed between the upper box body 20 and the sunshading part 40. The air flow layer is blocked between the sunshading part 40 and the upper box body 20, thereby preventing the transfer of heat from the sunshading part 40 to the upper box body 20, and reducing temperature rise of the camera assembly 30 inside the upper box body 20. Further, the air flowing inside the air flow layer takes away heat from the upper box body 20 and the sunshading part 40, thereby reducing temperature rise of the camera assembly 30 inside the upper box body 20. The problem of high temperature rise of the image acquisition apparatus 100 is solved and the working efficiency of the image acquisition apparatus 100 is enhanced.

The window 21 is of an external expansion structure to increase shooting angle of the camera assembly 30.

Optionally, the base 10 is detachably connected with the upper box body 20, the camera assembly 30 is detachably connected with the base 10, and the upper box body 20 is detachably connected with the sunshading part 40.

Further, the base 10 and the upper box body 20 can be connected with screws, the camera assembly 30 and the base 10 can be connected with screws, and the upper box body 20 and the sunshading part 40 can be connected with screws, which are not limited herein.

Optionally, the material of the base 10 is metal.

Further, the material of the base 10 is aluminum alloy, aluminum alloy has a higher thermal conductivity, which improves heat dissipation efficiency and facilitates reduction of temperature rise of the image acquisition apparatus 100.

Figure 7:
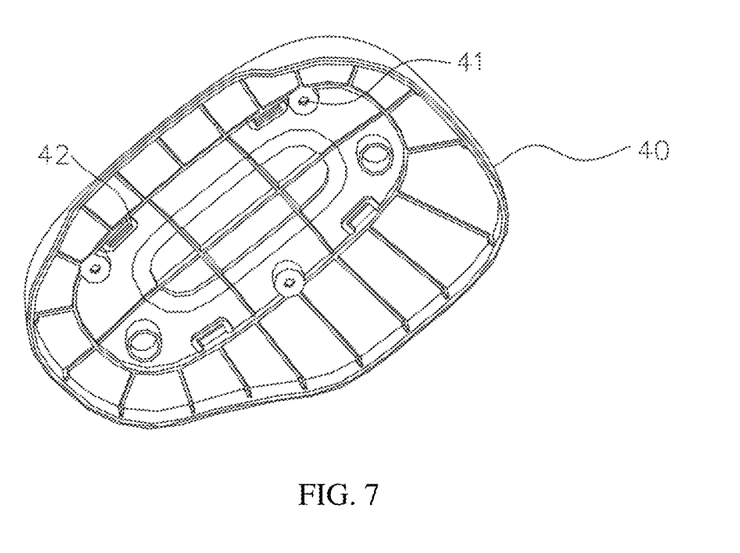
FIG. 7 is a schematic diagram of a sunshading part with bolts in an image acquisition apparatus provided in accordance with the present application.
Figure 8:
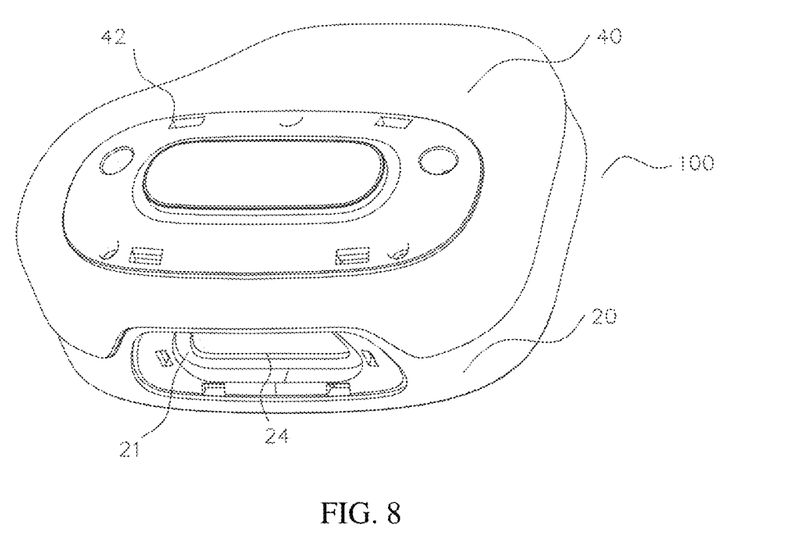
FIG. 8 is a schematic diagram of a combination of an upper box body and a sunshading part in an image acquisition apparatus provided in accordance with the present application.
Figure 9:
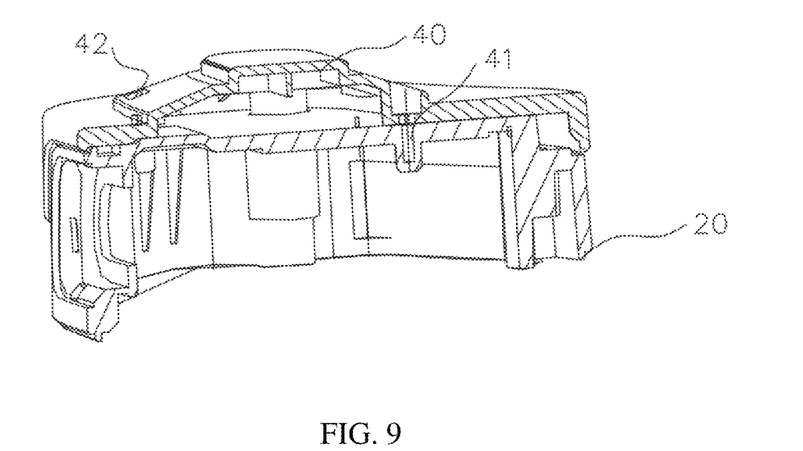
FIG. 9 is a cross-sectional view of a combination of an upper box body and a sunshading part in an image acquisition apparatus provided in accordance with the present application.

Preferably, a surface of the sunshading part 40 near the upper box body 20 is provided with a plurality of bolts 41, and a surface of the upper box body 20 near the sunshading part 40 is provided with a plurality of bolt holes 22.

Further, screw spikes pass through the bolts 41 from the upper surface of the sunshading part 40 and are connected to the bolt holes 22 respectively to fix the sunshading part 40 to the upper box body 20. The bolts 41 are disposed protruding from the upper surface of the sunshading part 40. When the sunshading part 40 is fixed to the upper box body 20, lower surfaces of the bolts 41 are abutted against peripheries of the bolt holes 22, respectively, so that the sunshading part 40 is disposed spaced from the upper box body 20, and the air flow layer is formed between the sunshading part 40 and the upper box body 20. The air flow layer is blocked between the sunshading part 40 and the upper box body 20, thereby preventing the transfer of heat from the sunshading part 40 to the upper box body 20, and reducing temperature rise of the camera assembly 30 inside the upper box body 20. Further, the air flowing inside the air flow layer takes away heat from the upper box body 20 and the sunshading part 40, thereby reducing temperature rise of the camera assembly 30 inside the upper box body 20. The image acquisition apparatus 100 of the present application solves the problem of high temperature rise of the image acquisition apparatus 100.

Figure 3:
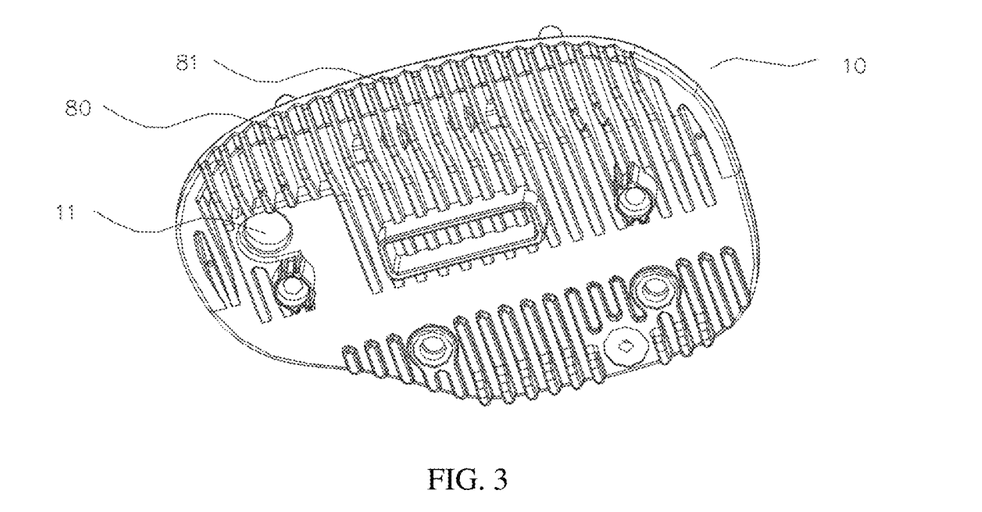
FIG. 3 is a schematic diagram of a combination of a base and a heat dissipation part in an image acquisition apparatus provided in accordance with the present application.
Figure 4:
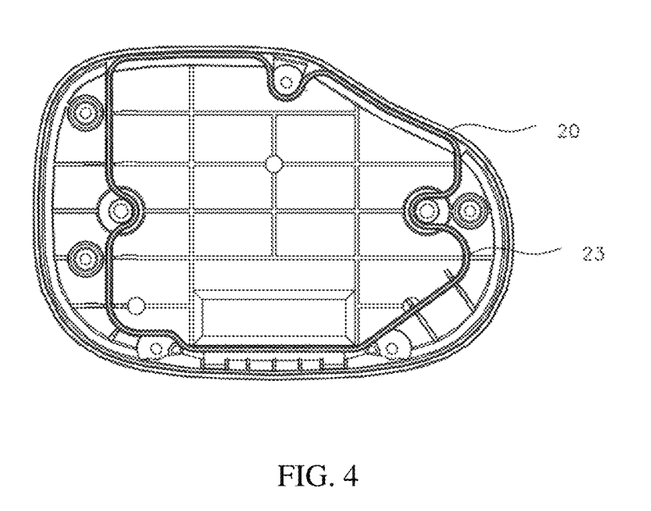
FIG. 4 is a schematic diagram of an upper box body with a first rib structure in an image acquisition apparatus provided in accordance with the present application.
Figure 5:
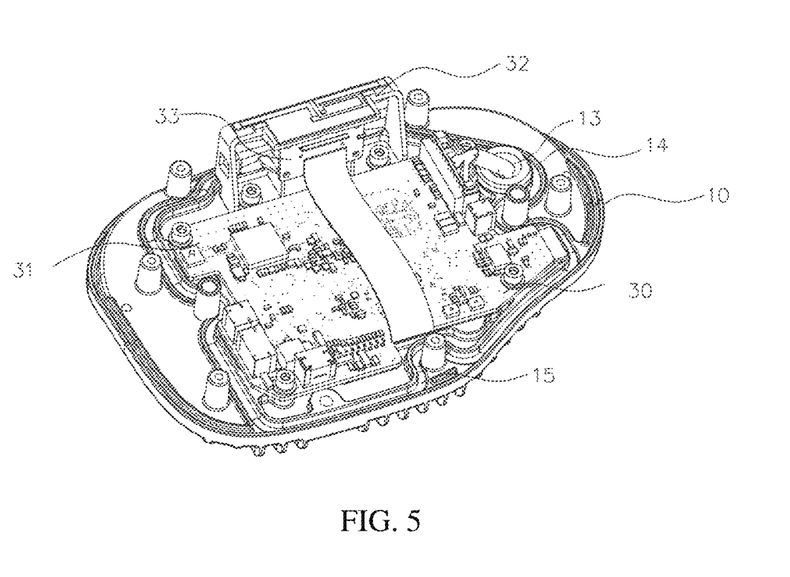
FIG. 5 is a schematic diagram of a combination of a base and a camera assembly in an image acquisition apparatus provided in accordance with the present application.
Figure 6:
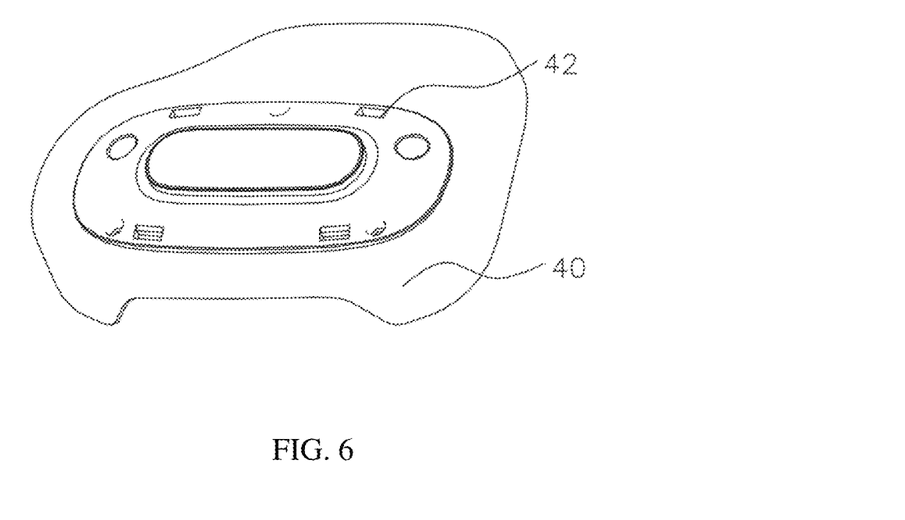
FIG. 6 is a schematic diagram of a sunshading part in an image acquisition apparatus provided in accordance with the present application.

Referring to FIGS. 3 to 5, preferably, a lower surface of the base 10 is provided with a wiring hole 11, and the wiring hole 11 is used for a wire harness to pass through, and a rubber plug 13 is disposed between the wire harness and the wiring hole 11.

The rubber plug 13 is disposed between the wire harness and the wiring hole 11, so that there is no gap between the wire harness and the wiring hole 11 for waterproofing.

Optionally, the lower surface of the base 10 is provided with a test hole, and the test hole is used for extracting air from the interior of the cavity.

The test hole is provided to test waterproof performance of the image acquisition apparatus 100 provided in the present application by using an air pump to extract air from the interior of the cavity through the test hole, and after the test is completed, a patch is attached to the test hole by double-sided adhesive for sealing, in addition, a waterproof tape can also be attached to the test hole for sealing, which is not limited herein.

Referring to FIGS. 4 to 5, preferably, an upper surface of the base 10 is provided with a circle of closed groove 14. An inner surface of the upper box body 20 is vertically provided with a circle of closed first rib 23. The first rib 23 is embedded in the groove 14 for interference fit. The first rib 23, the groove 14, the base 10, and the upper box body 20 enclose to form a first cavity, and the camera assembly 30 is placed in the first cavity.

The first rib 23 is embedded in the groove 14 for interference fit, which is in order to prevent water from entering the first cavity, so as to avoid water from entering the camera assembly 30 to make the camera assembly 30 not work properly. The shapes of the first rib 23 and the groove 14 can be circular or elliptic, and the shapes of the first rib 23 and the groove 14 in the present application are matched, which is not limited herein.

Referring to FIGS. 4 to 5, preferably, a waterproof ring 15 is provided in the groove 14, and an upper surface of the first rib 23 is pressed against the waterproof ring 15.

The waterproof ring 15 is provided to play a waterproof role to prevent water from entering the interior of the first cavity.

Referring to FIG. 8, preferably, the upper box body 20 further includes a transparent part 24, and the transparent part 24 is embedded on the window 21.

The transparent part 24 is provided to protect the camera assembly 30 from scratching. Optionally, an outer surface of the transparent part 24 is provided with a high-definition film or a blue light film, the high-definition film or blue light film can make shoot effect of the camera assembly 30 better as well as protect the outer surface of the transparent part 24 from scratching. Referring to FIGS. 1 to 5, preferably, the camera assembly 30 includes a control board 31, a camera bracket 32 and a camera 33. The control board 31 is fixedly disposed on the base 10, the camera bracket 32 is vertically disposed on the base 10, the camera bracket 32 is disposed in front of the control board 31, the camera 33 is fixedly disposed on the camera bracket 32, the camera 33 and the window 21 are correspondingly provided, and the control board 31 is electrically connected to the camera 33 and the wire harness, respectively.

The control board 31 and the camera bracket 32 can be disposed on the base 10 with screws. Referring to FIG. 5, preferably, the control board 31 is disposed parallel to a bottom surface of the base 10, the camera bracket 32 is disposed perpendicular to the bottom surface of the base 10, the camera 33 is disposed on the camera bracket 32, and the camera 33 and the control board 31 are designed non-parallel to reduce space sharing degree and reduce the influence of temperature rise of the control board 31 on the camera 33.

To further illustrate this embodiment, for example, when a self-moving device 200 works outdoors, it possible occur the situation of visual blind spots, and an image of a visual blind spot is taken by the camera 33 and transmitted to the control board 31, and then is transmitted by the control board 31 through the wire harness to a display of the self-moving device 200 for a driver to perform real-time observation as well as real-time specific operation. For example, if the image capture device 100 is used in a harvester, the driver accurately harvests corn stalks in visual blind spots based on the uploaded images. The scenario is not limited herein.

Optionally, the camera assembly 30 further includes a cable and a wireless transmission device; the control board 31 and the camera 33 are electrically connected by the cable or a wireless mode.

Further, the cable is a flexible printed circuit cable (FPC cable), and the control board 31 and the camera 33 are electrically connected via the FPC cable or the wireless transmission device.

Referring to FIGS. 6 to 9, preferably, the sunshading part 40 is convex, and the sunshading part 40 is provided with a plurality of heat dissipation holes 42.

The sunshading part 40 is disposed in a convex shape and an outer end surface of the sunshading part 40 is provided with the plurality of heat dissipation holes 42, thereby promoting air flowing and avoiding the accumulation of high temperature air between the sunshading part 40 and the upper box body 20, this benefits to the internal heat dissipation of the image acquisition apparatus 100.

Referring to FIGS. 1 to 2, preferably, the image capture device 100 further includes a decorative cover plate 50; the decorative cover plate 50 is detachably disposed above the sunshading part 40.

The sunshading part 40 can be covered by the decorative cover plate 50 in a snap-fit manner, and the decorative cover plate 50 is provided to cover the bolts in the sunshading part 40 to make the appearance of the image acquisition apparatus 100 more beautiful.

Referring to FIGS. 1 to 2, preferably, the image capture device 100 further includes a front cover 60; the front cover 60 is provided with a through-hole 61; the front cover 60 is disposed in front of the upper box body 20, the upper box body 20 is detachably connected with the front cover 60, and the through-hole 61 and the window 21 are correspondingly provided.

The front cover 60 is provided to protect the transparent part 24, and the size of the through-hole 61 is smaller than or equal to that of the transparent part 24 to avoid the transparent part 24 from scratching and also to make the appearance of the image acquisition apparatus 100 more beautiful. The front cover 60 can be disposed on the upper box body 20 by a buckle, which is not limited herein.

Referring to FIG. 1, preferably, the image acquisition apparatus 100 further includes a heat-conducting plate 70; the heat-conducting plate 70 is disposed between the base 10 and the control board 31. The surfaces of the control board 31, the heat-conducting plate 70, and the base 10 fit to each other to facilitate the transfer of heat from the control board 31 to the external air by means of solid heat conduction and to enhance heat dissipation rate. The image acquisition apparatus 100 of the present application solves the problem of high temperature rise of the image acquisition apparatus 100 and enhances the working efficiency of the image acquisition apparatus 100.

The heat-conducting plate 70 is provided for heat dissipation of the control board 31. The heat-conducting plate 70 is a silicone heat-conducting plate. The silicone heat-conducting plate has a suitable softness and can well fit to the surfaces of the control board 31 and the base 10. In addition, the silicone heat-conducting plate is chemically stable and will not contaminate components of the control board 31.

Referring to FIGS. 1 to 3, preferably, the image capture device 100 further includes a heat dissipation part 80.

The heat dissipation part 80 includes a plurality of second ribs 81, and the surface of the base 10 away from the camera assembly 30 is vertically provided with a plurality of second ribs 81 at predetermined intervals, and the plurality of second ribs 81 are used to increase the surface area of the base 10.

The heat dissipation part 80 is disposed on the base 10 to increase the surface area of the base 10, and the plurality of second ribs 81 are disposed vertically at predetermined intervals on the lower surface of the base 10 to make for solving the problem of high temperature rise of the image capture device 100 and to enhance the work efficiency of the image capture device 100.

Herein, the number of the second ribs 81 is not limited as long as the base 10 can achieve the best heat dissipation effect.

Figure 10:
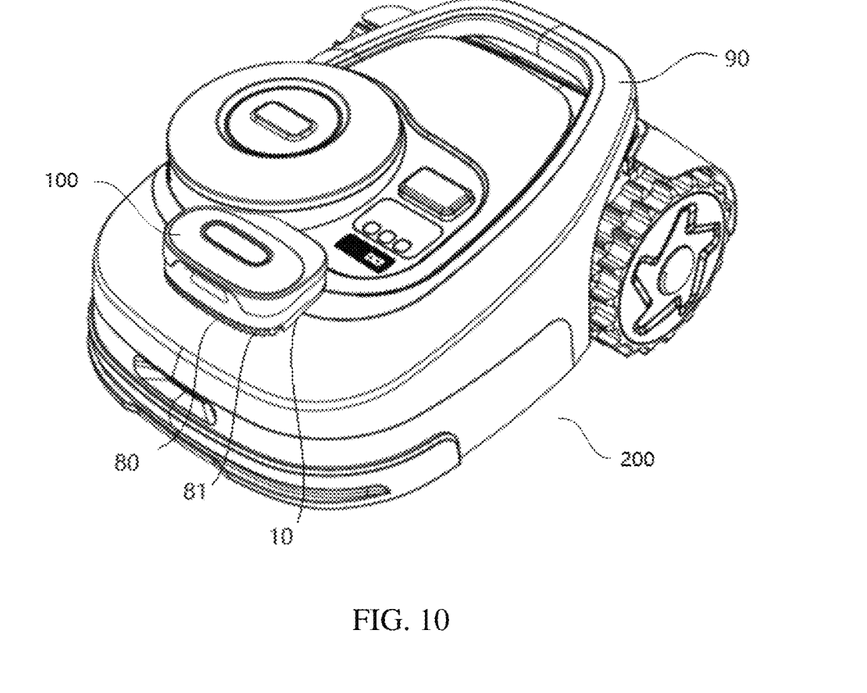
FIG. 10 is a schematic diagram of a combination of an image acquisition apparatus and a vehicle body in a self-moving device provided in accordance with the present application.

Preferably, the image acquisition apparatus 100 is detachably disposed on the self-moving device 200, and the image acquisition apparatus 100 is electrically connected to a main board in the self-moving device 200.

Referring to FIG. 10, the present application provides a self-moving device. The self-moving device 200 provided in the present application can solve the problem of high temperature rise of the image acquisition apparatus 100 and enhance the working efficiency of the image acquisition apparatus 100.

The self-moving device 200 includes the image acquisition apparatus 100 described above. The image acquisition apparatus 100 can be used to solve the problem of high temperature rise of the image acquisition apparatus 100 and enhance the working efficiency of the image acquisition apparatus 100.

Referring to FIG. 10, optionally, the self-moving device 200 further includes a vehicle body 90, and the image acquisition apparatus 100 is detachably disposed on an outer surface of the vehicle body 90.

The image acquisition apparatus 100 is used to provide visual information to the vehicle body 90, and when there is a visual blind spot, the image acquisition apparatus 100 can be used to avoid and locate.

Optionally, the self-moving device 200 further includes a vehicle body 90, and a surface of the heat dissipation part 80 away from the base 10 fits to the outer surface of the vehicle body 90, i.e., surfaces of the plurality of second ribs 81 away from the base 10 fit to the outer surface of the vehicle body 90.

This embodiment is further illustrated, when the car body 90 is a mower, the surface of the heat dissipation part 80 away from the base 10 fits to the outer surface of the mower, i.e., the surfaces of the plurality of second ribs 81 away from the base 10 fit to the outer surface of the mower, thereby improving the stability of the image capture device 100 mounted on the mower.

The image acquisition apparatus 100 is used to provide visual information to the vehicle body 90, and when there is a visual blind spot, the image acquisition apparatus 100 can be used to assist, an image is taken by the camera 33 and transmitted to the control board 31, and then is transmitted by the control board 31 to the main board of vehicle body 90, and then is shown by a display for a driver to view and perform real-time specific operations. For example, if the image acquisition apparatus 100 is used in a harvester, the driver accurately harvests corn stalks in visual blind spots based on the uploaded images.

Optionally, an outer end of the image acquisition apparatus 100 is provided with a protective shell at a predetermined spacing.

The protective shell may be located on the vehicle body 90 or on the image acquisition apparatus 100, which is not limited herein. When the image capture device 100 is used in a mower or a harvester machine, there will be spatter materials during the mower or harvester works, and the protective shell plays a protective role on the image acquisition apparatus 100, and also prevents water from entering the image capture device 100 under raining.

Scenario 1:

When the image capture device 100 is used in a mower, the image capture device 100 is detachably mounted on the mower, and the mounting position on the mower depends on the position of the driver's visual blind spot. The mower generally works during the daytime, so that the image capture device 100 cannot avoid direct sunlight and the generation of heat itself when working. The image capture device 100 is provided with the sunshading part 40, the sunshading part 40 is disposed at the side of the upper box body 20 away from the base 10, and the sunshading part 40 is disposed spaced from the upper box body 20, the sunshading part 40 is used to shade the sunlight and avoid the sunlight from directly irradiating the upper box body 20, thereby reducing light energy absorbed by the upper box body 20, and thus reducing temperature rise of the camera assembly 30 inside the upper box body 20. On the other hand, the upper box body 20 is disposed spaced from the sunshading part 40, and an air flow layer is formed between the upper box body 20 and the sunshading part 40. The air flow layer is blocked between the sunshading part 40 and the upper box body 20, thereby preventing transfer of heat from the sunshading part 40 to the upper box body 20, and reducing temperature rise of the camera assembly 30 inside the upper box body 20. Further, the air flow layer within the air flow layer takes away heat from the upper box body 20 and the sunshading part 40, thereby reducing temperature rise of the camera assembly 30 inside the upper box body 20. The sunshading part 40 is provided to solve the problem of high temperature rise of the image acquisition apparatus 100 and enhance the working efficiency of the image acquisition apparatus 100.

To sum up, the base 10 and the upper box body 20 of the image acquisition apparatus 100 provided in the present application form a cavity for placing the camera assembly 30. The sunshading part 40 is disposed spaced from the upper box body 20, and the sunshading part 40 is used to shade the sunlight and avoid the sunlight from directly irradiating the upper box body 20, thereby reducing the light energy absorbed by the upper box body 20, and thus reducing temperature rise of the camera assembly 30 inside the upper box body 20. On the other hand, the upper box body 20 is disposed spaced from the sunshading part 40, and an air flow layer is formed between the upper box body 20 and the sunshading part 40. The air flow layer is blocked between the sunshading part 40 and the upper box body 20, thereby preventing the transfer of heat from the sunshading part 40 to the upper box body 20, and reducing temperature rise of the camera assembly 30 inside the upper box body 20. Further, the air flow layer within the air flow layer takes away heat from the upper box body 20 and the sunshading part 40, thereby reducing temperature rise of the camera assembly 30 inside the upper box body 20. The present application solves the problem of high temperature rise of the image acquisition apparatus 100 and enhances the working efficiency of the image acquisition apparatus 100.

It should be illustrated that not all the steps and modules in respective processes and respective system structure diagrams above are necessary, and certain steps or modules can be ignored according to actual needs. The order of execution of respective steps is not fixed and can be adjusted as needed. The system structure described in the aforesaid examples may be physical structure or logical structure, i.e., some modules may be implemented by a same physical entity or some modules may be implemented by multiple physical entities, respectively, or may be implemented by certain components of multiple independent devices together.

In each of the examples above, a hardware module may be implemented by mechanical means or electrical means. For example, a hardware module may include permanently dedicated circuitry or logic (e.g., a specialized processor, FPGA or ASIC) to perform corresponding operations. A hardware module may also include programmable logic or circuitry (e.g., a general-purpose processor or other programmable processors) that can be temporarily set by software to perform corresponding operations. The specific implementation means (mechanical means, or dedicated permanent circuitry, or temporary set circuitry) can be determined based on cost and time considerations.

The present application is presented and illustrated in detail above by the accompanying drawings and preferred examples. However, the present application is not limited to these disclosed examples, based on the aforesaid multiple examples, it is known to persons of ordinary skill in the art that more examples of the present application can be obtained by combining the code review means in the various examples described above, and these examples are also within the scope of protection of the present application.

What is claimed is:

1. An image acquisition apparatus, comprising:
   a base;
   an upper box body, the upper box body is detachably disposed on the base, a cavity is formed between the upper box body and the base, and a front end face of the upper box body is provided with a window;
   a camera assembly fixedly disposed on the base and placed in the cavity, and the camera assembly and the window are correspondingly provided;
   a sunshading part disposed at a side of the upper box body away from the base, and the sunshading part is disposed spaced from the upper box body;
   the camera assembly comprises a control board, a camera bracket, and a camera; and
   the control board is fixedly disposed on the base, the camera bracket is vertically disposed on the base, the camera bracket is disposed in front of the control board, the control board is disposed parallel to a bottom surface of the base, the camera is disposed non-parallel to the control board.

2. The image acquisition apparatus according to claim 1, wherein a surface of the sunshading part near the upper box body is provided with a plurality of bolts, and a surface of the upper box body near the sunshading part is provided with a plurality of bolt holes.

3. The image acquisition apparatus according to claim 1, wherein a lower surface of the base is provided with a wiring hole for a wire harness to pass through, and a rubber plug is disposed between the wire harness and the wiring hole.

4. The image acquisition apparatus according to claim 3, wherein an upper surface of the base is provided with a circle of closed groove, an inner surface of the upper box body is vertically provided with a circle of closed first rib, the first rib is embedded in the groove for interference fit, and the first rib, the groove, the base, and the upper box body enclose to form a first cavity, and the camera assembly is placed in the first cavity.

5. The image acquisition apparatus according to claim 4, wherein a waterproof ring is disposed in the groove, and an upper surface of the first rib is pressed against the waterproof ring.

6. The image acquisition apparatus according to claim 1, wherein the upper box body further comprises a transparent part, and the transparent part is embedded on the window.

7. The image acquisition apparatus according to claim 3, wherein
   the camera is fixedly disposed on the camera bracket, the camera and the window are correspondingly provided, and the control board is electrically connected to the camera and the wire harness, respectively.

8. The image acquisition apparatus according to claim 1, wherein the sunshading part is convex, and the sunshading part is provided with a plurality of heat dissipation holes.

9. The image acquisition apparatus according to claim 1, wherein the image acquisition apparatus further comprises a decorative cover plate; and
   the decorative cover plate is detachably disposed above the sunshading part.

10. The image acquisition apparatus according to claim 1, wherein the image acquisition apparatus further comprises a front cover;
    the front cover is provided with a through-hole; and
    the front cover is disposed in front of the upper box body, the upper box body is detachably connected with the front cover, and the through-hole and the window are correspondingly provided.

11. The image acquisition apparatus according to claim 7, wherein the image acquisition apparatus further comprises a heat-conducting plate; and
    the heat-conducting plate is disposed between the base and the control board.

12. The image acquisition apparatus according to claim 7, wherein the image acquisition apparatus further comprises a heat dissipation part; and
    the heat dissipation part comprises a plurality of second ribs, and the lower surface of the base away from the camera assembly is disposed with the plurality of second ribs at predetermined intervals, and the plurality of second ribs are configured to increase surface area of the base.

13. A self-moving device comprising the image acquisition apparatus according to claim 1.

\* \* \* \* \*